Aug. 12, 1958    J. F. SENGELAUB ET AL    2,846,718
APPARATUS FOR CUTTING UP POULTRY
Filed June 27, 1955    3 Sheets-Sheet 1

INVENTORS
JOHN F. SENGELAUB
MERRITT I. DARROW
BY
R. G. Story
ATTORNEY

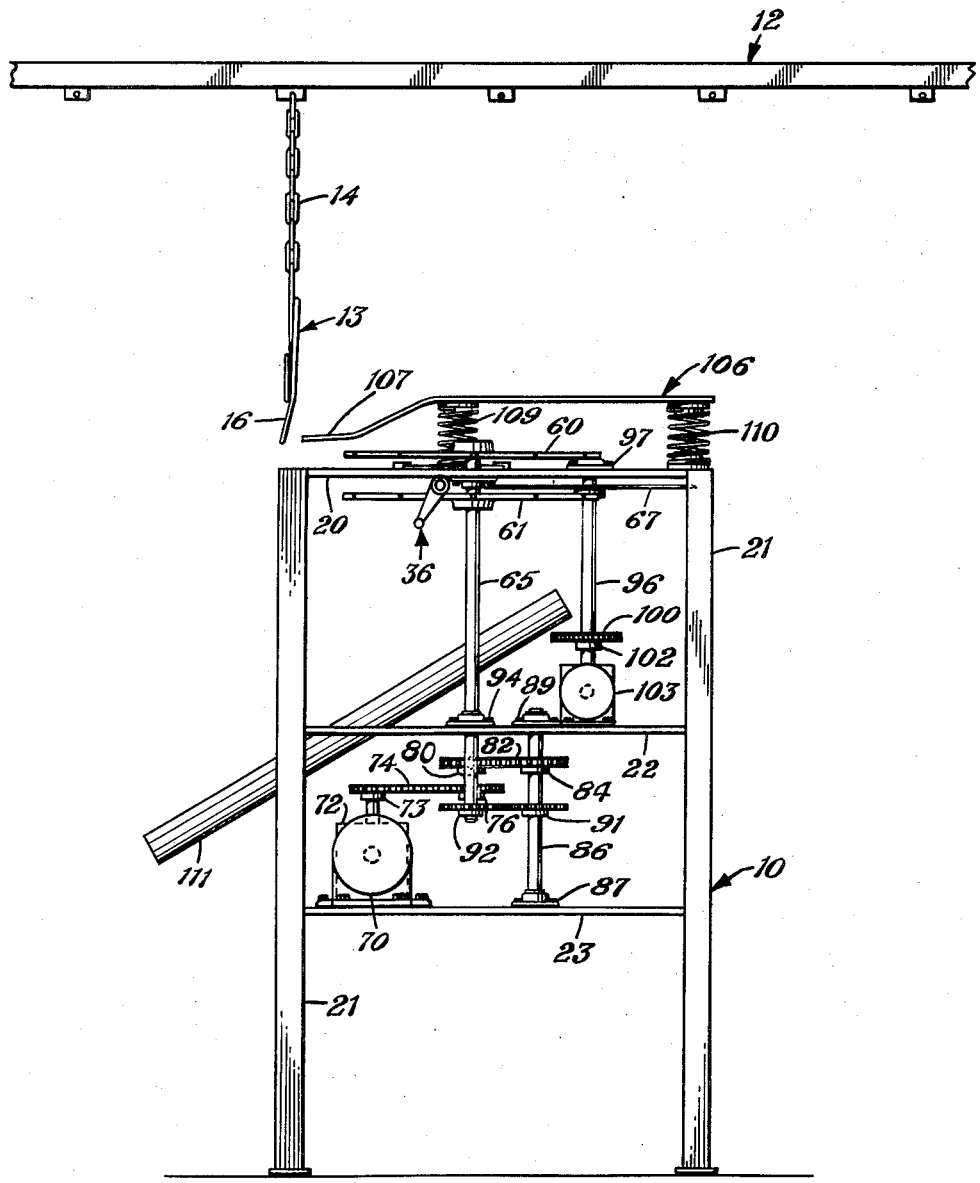

INVENTORS
JOHN F. SENGELAUB
MERRITT I. DARROW
BY
R. G. Stoy
ATTORNEY

United States Patent Office 2,846,718
Patented Aug. 12, 1958

2,846,718

APPARATUS FOR CUTTING UP POULTRY

John F. Sengelaub, Park Forest, and Merritt I. Darrow, La Grange, Ill., assignors to Swift & Company, Chicago, Ill., a corporation of Illinois Application June 27, 1955, Serial No. 518,184

9 Claims. (Cl. 17—11)

This invention relates to certain novel improvements in equipment for the severing of body members or extremities, e. g. legs and necks, from a poultry carcass, and provides an apparatus which permits the severing of these body members without the necessity of removing the poultry from the conveying line.

In modern poultry dressing plants, the poultry are carried by an overhead conveying line to the various operations of defeathering, evisceration, washing and other processing necessary to the preparation of a dressed fowl. Normally, the poultry are shackled by their legs, with their heads hanging freely, and with the shackle being carried by a chain suspended from the overhead conveyor. After passage of the poultry through the last washing operation, an operator will remove their necks by manually shearing. Following this, two operators will, in turn, release the dressed carcasses from the conveying line, transfer them to a hand-operating leg cutter, align the legs in the cutter, and manually sever them. The poultry carcasses are then placed in a chill tank of ice and water. If the operation should be speeded up, two men will be required for the removing of the necks, and three men for the severing of the legs.

It is an object of this invention to provide a labor-saving apparatus to facilitate the cutting of body members or extremities from poultry carcasses.

It is a further object to provide an apparatus that will assure the severance of the body member at a uniform place on each successive poultry processed.

Additional objects will be apparent to one skilled in the art from the following detailed description of this invention.

Generally speaking, the apparatus of the invention, which is designed for use with an overhead conveyor-type dressing line, comprises a structure having a passageway in its upper surface which is adapted to receive the particular body part of the carcass being severed. A cutting means is disposed transversely of this passageway and means are provided, independent of the movement of the conveying line, for forcing the body part along at least a portion of the passageway into contact with the cutting means.

In our presently preferred embodiment, a pair of horizontally disposed rotatable wheels are vertically disposed from each other on a common axis in close association to the passageway. Recesses are spaced around the peripheries of the two wheels. These recesses are of a configuration adapted to receive the body part being severed. The common axis of the two wheels is spaced at such a distance from the passageway so as to permit, with the revolution of the wheels, successive vertical alignment of the recesses with the passageway forming substantially closed pockets. Such an arrangement facilitates the holding of a portion of the body part being severed in a relatively erect position (between the wheels) while the body part is moved along the passageway by the revolving wheels. A cutting means is disposed transversely of, and extends substantially across, the passageway in a horizontal plane between the two wheels and is so placed as to permit contact to the body part with the cutting means while the body part is being positively moved by the rotating wheels.

Figure 2 is a side elevational view of the machine of Fig. 1.

Figure 1:
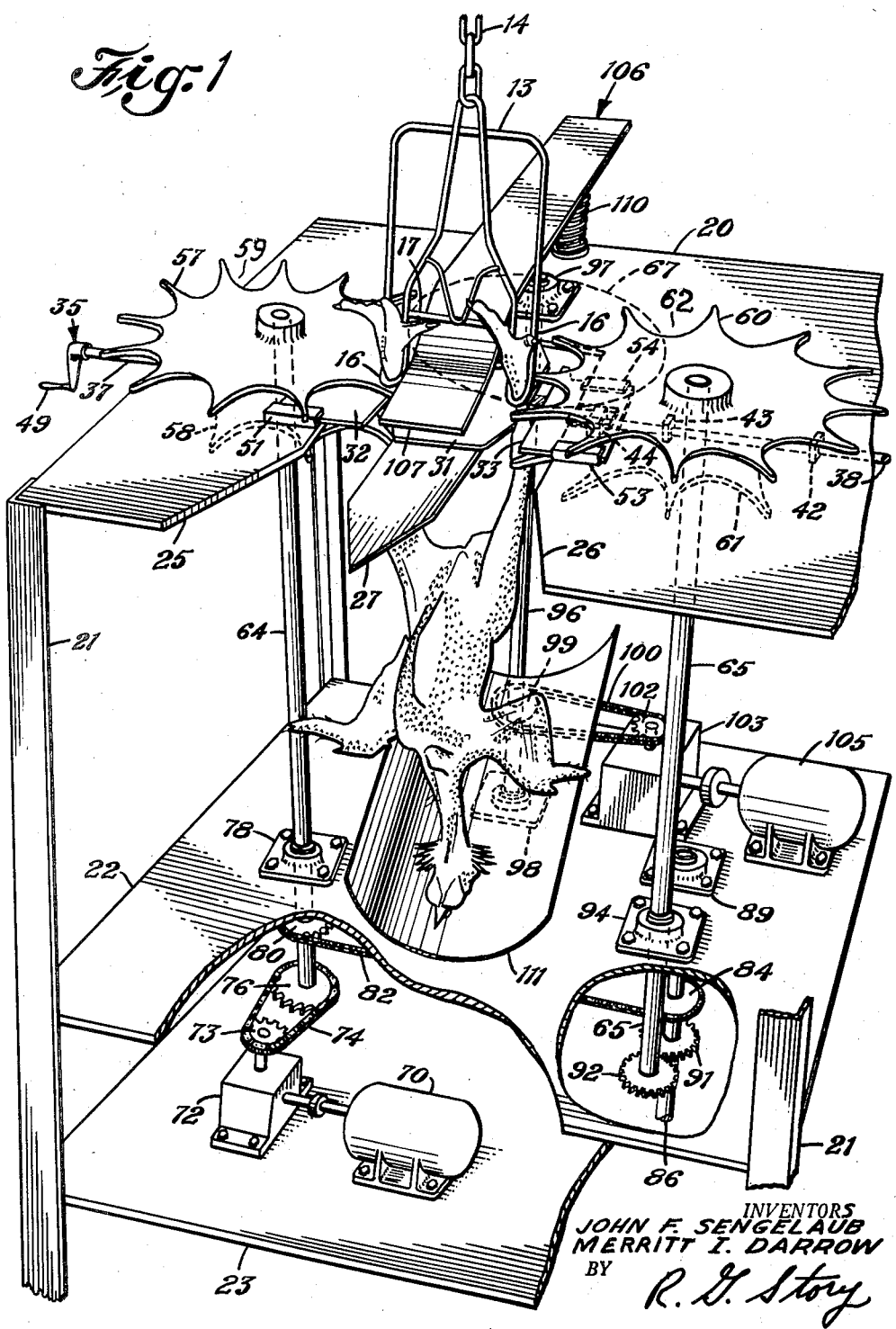
Figure 1 is an isometric view, partially cut away, of a leg severing apparatus of the invention.
Figure 4:
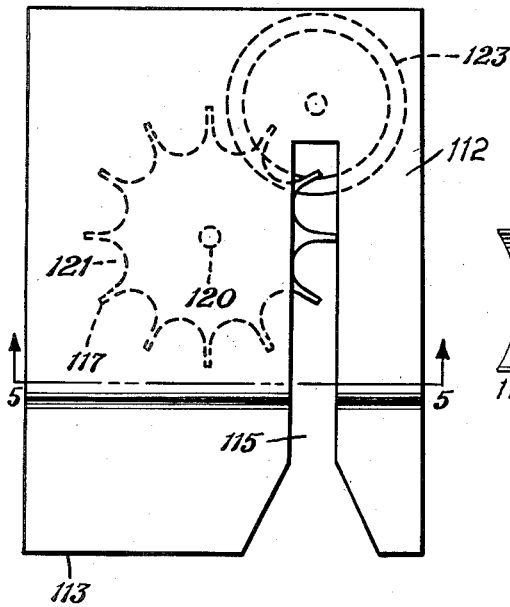
Figure 4 is a diagrammatic plan view of a neck-cutting machine of the invention.
Figure 3:
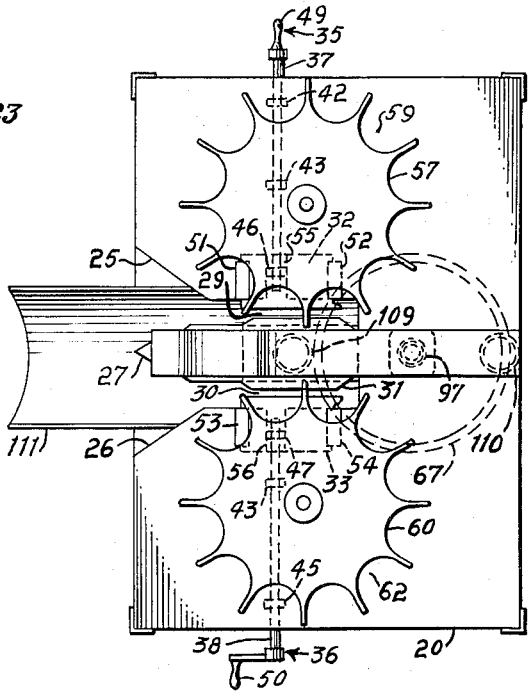
Figure 3 is a plan view of the machine of Figs. 1 and 2.
Figure 5:
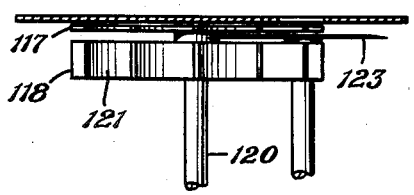
Figure 5 is a partial cross sectional view taken along line 5—5 of Fig. 4.
Figure 6:
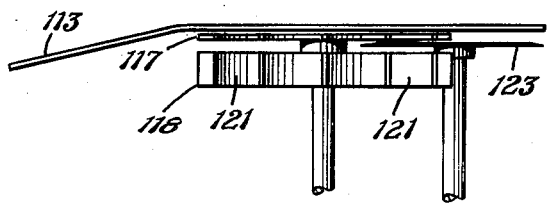
Figure 6 is a partial side elevation of the machine of Fig. 4.

The principles of the present invention may be incorporated in machines designed for severing various body parts or extremities from poultry carcasses. The machine illustrated in Figures 1, 2, and 3 is an embodiment of the invention adapted to the removal of the legs of a chicken or other poultry at the hock joints, and the apparatus illustrated in Figures 4, 5, and 6 is used for the cutting of the necks from poultry carcasses. Both modifications are designed for use with an overhead conveyor-type dressing line where the poultry are carried by their feet from a shackle suspended from the line and continuously moved from one processing station to another.

As shown in Figure 2, the leg-cutting machine 10 is placed immediately below a conveyor line 12 which carries a conventional poultry shackle 13 by a chain 14. As illustrated in Figure 1, the chicken or other poultry is held by its legs in two spaced and downwardly extending leg-holding loops 16 which form the lower corners of the shackle. The two leg-holding loops are spaced apart by a horizontal cross member 17.

The leg-cutting machine has for its top side or upper member 20 a heavy sheet metal plate horizontally disposed and supported at its four corners by legs 21. The structure below the table top has an intermediate deck 22 and a still lower deck 23. The two decks support the gear mechanism and motors for powering the machine.

The heavy plate table top has two inwardly converging channels 25 and 26 separated by a tongue 27 which is integral with the top proper. As best seen in Figure 3, the two channels narrow into two parallel inner passageways 29 and 30 which are defined by a centrally disposed plate 31 resting on the tongue 27 and the two sizing plates 32 and 33. Opposite sides of the centrally disposed plate 31 form the inner sides of the two passageways, with the outer sides being defined by the two movable sizing plates 32, 33. The sizing plates are each individually movable laterally of the length of their respective passageway by crank screw mechanism 35, 36. Such arrangement permits the adjustment of the width of the passageways. The crank screw mechanisms each have a long rod 37, 38, extending from the side of the machine immediately beneath the table top through two supporting lugs 42, 43, and 44, 45, respectively, to their respective sizing plates. The two sets of lugs are welded to the underside of the table top. The inner end of each rod is externally threaded and couples with an internally threaded third lug 46 or 47 which is welded to the underside of its respective sizing plate. The crank screw mechanisms are provided with handles 49, 50. The sizing plates 32, 33 ride on the upper surface of the table top and are slidably held in position by a set of two angle members 51, 52, and 53, 54, respectively, which are welded to the upper surface of the table top. Beneath each sizing plate there is a cut-out portion 55 and 56 of the table top to permit the welding of the inner lugs, 46, 47 to the underside of their respective sizing plates and to permit movement of the sizing plates laterally of the inner passageways by the crank screw mechanisms.

There are associated with each inner passageway a set of two horizontally disposed wheels 57, 58 and 60, 61, each wheel of which has equally spaced indentations or recesses 59 and 62 around its periphery. One wheel of each pair is placed above the table top and the other wheel below, with both being carried by a vertically disposed shaft 64 or 65. As best seen in Figure 3, with the revolving of a pair of the wheels the peripherial recesses of those wheels will successively pass over the inner passageway forming substantially closed pockets. At intervals, the vertically aligned recesses of the upper and lower wheels of each pair will contact a poultry leg and together move the two legs along the spaced passageways into contact with a circular, horizontally disposed knife 67.

A motor 70 disposed on the lower deck powers the mechanical linkage which drives the two pairs of horizontally disposed wheels. The motor is connected through a gear reduction box 72 to a driving sprocket 73 which meshes with a link chain 74 to drive a sprocket 76. The driven sprocket 76 is fastened to the lower end of the vertically disposed drive shaft 64 which is supported by a bearing 78 carried by the intermediate deck 22. The shaft 64 extends upwardly from the intermediate deck through and to a point above the table top. At its upper end the shaft carries the upper wheel and below the table top it supports the other wheel of that pair. The drive shaft carries a second sprocket 80 above the sprocket placed at its lower end and at a point along its length below the intermediate deck. The second sprocket is connected by a link chain 82 to a gear 84 of a vertically disposed idler shaft 86 which is supported at its lower end by bearing 87 resting on the lower deck and at its upper end by a second bearing 89 which is mounted on the intermediate deck. The idler shaft 86 has placed intermediate of its length a drive gear 91 which meshes with a driven gear 92 placed at the lower end of the long, vertically disposed, drive shaft 65. This drive shaft extends upwardly from a point above the lower deck through the intermediate deck where it is supported by a bearing 94 to a point above the table top. This latter shaft 65 drives the other pair of wheels.

The circular knife 67 lies in a horizontal plane intermediate the planes of the two wheels of each of the pairs and is so placed that its cutting edge will come into contact with the legs of the poultry as they are being positively moved along the inner passageway by the two pairs of wheels. The knife which is immediately below the table top is driven by a long, vertically placed shaft 96 which is supported at its upper end by a bearing 97, and at its lower end by a bearing 98 resting on the intermediate deck. The shaft which carries a sprocket 99 adjacent its lower end is connected by a link chain 100 to a driving sprocket 102 which is coupled through a gear reduction box 103 to a motor 105.

The leg cutting apparatus is provided with a shackle elevating arrangement to assure the severing of the legs at the same point of each successive bird processed. Without such a provision, the birds' legs would be severed at different points depending on the length of each bird. It will be recalled that the inner passageways 29, 30 have for their outer sides laterally movable sizing plates 32, 33. These sizing plates permit the adjustment of the width of the inner passageways to a dimension that will forestall the vertical movement of the hocks therethrough. Since poultry of the same general size, e. g. fryers, stewing hens, capons, etc. are processed together, it is possible to adjust the width of the passageway to the dimension necessary for the general class of birds being dressed. A shackle elevating arrangement 106 brings the hocks of the poultrys' legs into engagement against the sides of the respective passageways. The shackle elevating arrangement is made up of an elongated member 107 having an elongated upper surface (parallel to the line of movement of the poultry) and having a width less than the length of the cross member 17 of the shackle. The elongated member is carried by two heavy coil springs 109, 110 and it slants upwardly from its leading edge for a portion of its length and then levels off. The elongated member is disposed above and between the two passageways and extends from a point preceding them to the rear edge of the structure. As best seen in Figure 1, with the legs of the shackled fowl in the paralleling passageways, the cross member 17 of the shackle will lie immediately over the elongated member and, as the conveyor continues to move the shackled bird along its course, the shackle elevating arrangement will raise the shackle and draw the hocks flush against the sides of the passageway. The two sets of horizontally disposed wheels will together move the legs into contact with the cutting knife, thus assuring severing at the hock joints. The bird drops into a chute 111 which directs it to a chill tank or elsewhere.

The poultry neck cutting machine of our invention is illustrated in Figures 4, 5, and 6. In this embodiment, the substantially horizontally disposed table top or upper member 112 of the structure has an initial sloping area 113 from its leading edge to a point approximately a third of its length at which the top levels off. A narrow passageway 115 of a width which will permit the passage of the neck of the bird but forestall downward vertical passage of the poultry's body extends from the leading edge up the slope and some distance along the level portion of the table top. A pair of horizontally disposed rotatable wheels 117, 118 of the same diameter and mounted on a common shaft 120 is associated with the passageway. In this embodiment, both of the wheels are disposed beneath the table with the lower one of the two wheels having a thickness substantially greater than the wheel overlying it. As in the leg cutting device, the wheels have spaced indentations 121 around their respective peripheries. The common axis of the two wheels is spaced such a distance from the passageway so as to assure that with the rotation of the wheels, their peripheral recesses or indentations will pass in vertical alignment with the passageway forming substantially closed pockets. A circular knife 123 of the type described with respect to the other embodiment is disposed beneath the table top in a plane lying between the two wheels. The wheels and the circular knife may be driven through linkages like that shown and described with respect to the leg cutting apparatus.

The passageway extends longitudinally of and directly below the conveying line carrying the shackled poultry. The sloping table top of this embodiment serves the same purpose as the shackle elevating arrangement employed in connection with the leg cutting device, that is, its purpose is to assure severance of the necks of all of the birds processed at substantially the same point. The shackled bird approaches the neck cutting structure with its head hanging freely and supported by its legs from the shackle. The neck enters the passageway at its leading edge and the poultry carcass is moved along the length of the passageway by the conveyor. The level portion of a table top is at a height which causes the carcass proper to rest upon the table top and hence with each successive carcass resting on the table top, the circular knife will necessarily sever the necks at the same relative place.

Obviously, many modifications and variations of the invention as hereinbefore set forth may be made without departing from the spirit and scope thereof, and therefore only such limitations should be imposed as are indicated in the appended claims.

We claim:

1. In an apparatus designed for severing an extremity from the carcass of a poultry, the combination comprising an overhead conveyor, a shackle movably carried by said conveyor and designed to support the poultry, a passageway beneath said conveyor and parallel thereto and adapted to receive the extremity of the carcass, a cutting means extending substantially across said passageway, means independent of said conveyor and associated with the passageway for forcing the extremity along the passageway into contact with said cutting means, and self-regulating means associated with the passageway and the cutting means for vertically adjusting the elevation of the poultry carcass with relation to the cutting means to assure that severance of the extremity will occur at substantially the same relative place of each poultry processed.

2. In an apparatus designed for severing an extremity from the carcass of poultry, the combination comprising an overhead conveyor, a shackle movably carried by said conveyor and designed to support the poultry, a passageway beneath said conveyor and parallel thereto and disposed to receive the extremity of the carcass, a pair of horizontally disposed rotatable wheels having spaced indentations around their peripheries with said indentations being adapted to receive a portion of the extremity adjacent said indentations, said wheels being disposed vertically from each other on a common axis with the axis being spaced a distance from the passageway so as to permit with the revolution of the wheels vertical alignment of the indentations with the passageway during a portion of the revolution forming substantially closed pockets and permitting the holding of said portion of the extremity between said wheels in a relatively fixed erect position while moving the extremity along at least a portion of the passageway, a cutting means extending substantially across said passageway and lying in a horizontal plane between said wheels and placed to contact the extremity while it is being positively moved by said wheels, and means associated with the passageway and the cutting means for vertically adjusting the elevation of the poultry with relation to the cutting means to assure that severance of the extremity will occur at substantially the same relative place on each poultry processed.

3. In an apparatus designed for severing the legs from a poultry carcass at the hock joints, the combination comprising an overhead conveyor, a shackle movably carried by said conveyor having two legholders and a horizontal cross member disposed between said legholders, two passageways beneath said conveyor and parallel thereto placed at a height to receive the two legs of the poultry at a point above the hock joints, said passageways being of a width to forestall vertical movement of the hocks therethrough, a shackle elevating member disposed above and between the two passageways and movable vertically, said elevating member being elongated parallel to the line of movement of the poultry and of a width less than the length of the cross member of the shackle, said elevating member slanting upwardly along a portion of its length in the direction of movement of the poultry so as to elevate the shackle and the poultry held therein thus bringing the hocks of the legs into engagement against the sides of the respective passageways, a pair of horizontally disposed rotatable wheels associated with each of said passageways having spaced indentations around their respective peripheries with said indentations being adapted to receive portions of the legs adjacent said indentations, said wheels of each pair being disposed vertically from each other on a common axis with the axis of each pair being spaced on the side of its respective passageway away from the elevating member such a distance so as to permit with the revolution of the wheels vertical alignment of the indentations with the associated passageway during a part of the revolution forming substantially closed pockets and permitting the holding of a portion of the leg in a relatively fixed erect position while positively moving the leg along at least a portion of the passageway, and a cutting means extending substantially across said passageways and lying in a horizontal plane between the upper and lower wheels and placed to contact the legs while they are being positively moved by said wheels.

4. In an apparatus designed for severing the neck from the carcass of a poultry, the combination comprising an overhead conveyor, a shackle movably carried by said conveyor and designed to support the poultry by its legs, a substantially horizontally disposed upper member provided with a passageway beneath said conveyor, said passageway being in parallel alignment with said conveyor and disposed to receive the neck of the carcass, said passageway being wide enough to permit vertical movement of the neck and of a width to forestall downward vertical passage of the carcass proper, said upper member slanting upwardly in the direction of the movement of the poultry along at least a portion of its length and having a portion of its length at a height so as to permit the resting of the poultry carcass proper upon the upper sides of the passageway, a pair of horizontally disposed rotating wheels spaced beneath the passageway and having spaced indentations around their respective peripheries with said indentations being adapted to receive a portion of the neck of the carcass adjacent said indentations, said wheels being disposed vertically from each other on a common axis with the axis being spaced a distance from the passageway so as to permit with the revolution of the wheels vertical alignment of the indentations with the passageway during a part of the revolution forming substantially closed pockets and permitting the holding of said portion of the neck between said wheels in a relatively fixed erect position while positively moving the neck along at least a portion of the passageway, and a cutting means extending substantially across said passageway and lying in a horizontal plane between said wheels and placed to contact the neck while it is being positively moved by said wheels.

5. In an apparatus for severing extremity from a poultry carcass for use with an overhead type poultry dressing line, the combination comprising a structure, a passageway in an upper surface of the structure parallel to the overhead conveyor adapted to receive the extremity of the carcass, a pair of horizontally disposed rotatable wheels having spaced recesses around their peripheries with said recesses being adapted to receive a portion of the extremity adjacent said recesses, said wheels being disposed vertically from each other on a common axis with the axis being spaced a distance from the passageway so as to permit with the revolution of the wheels vertical alignment of successive recesses with the passageway during the revolution forming substantially closed pockets and permitting the holding of said portion of the extremity between said wheels in a relatively fixed erect position while moving the extremity along at least a portion of the passageway, a cutting means extending substantially across said passageway and lying in a horizontal plane between the wheels and so placed to contact the extremity while it is being positively moved by said wheels and self-regulating means associated with the passageway and cutting means for vertically adjusting the elevation of the poultry carcass with relation to the cutting means to assure that severance of the extremity will occur at substantially the same relative place on each poultry processed.

6. In an apparatus for severing the legs from a poultry carcass at the hock joints for use in conjunction with an overhead conveyor-type dressing line from which the poultry are supported by shackles having two leg holders and a horizontal cross member disposed between said leg holders, the combination comprising a structure having a substantially horizontally disposed upper member, two passageways in said upper member parallel to each other and placed at a height to receive the legs of the poultry at a point above the hock joints, said passageways being of a width to forestall vertical movement of the hocks therethrough, a shackle elevating member disposed above and between the two passageways and movable vertically, said elevating member being elongated parallel to the line of movement of the poultry and of a width less than the length of the cross member of the shackle, said elevating member slanting upwardly along a portion of its length in the direction of movement of the poultry so as to elevate the shackle and the poultry held therein with relation to the cutting means thus bringing the hocks of the legs into engagement against the sides of the respective passageways, a pair of horizontally disposed rotatable wheels associated with each of said passageways having spaced indentations around their respective peripheries with said indentations being adapted to receive portions of the legs adjacent said indentations, said wheels of each pair being disposed vertically from each other on a common axis with the axis of each pair being spaced on the side of its respective passageway away from the elevating member such a distance so as to permit with the revolution of the wheels vertical alignment of the indentations with the associated passageway during a part of the revolution forming substantially closed pockets and permitting the holding of a portion of the leg in a relatively fixed erect position while positively moving the leg along at least a portion of the passageway, and a cutting means extending substantially across each of said passageways and lying in a horizontal plane between the upper and lower wheels and placed to contact the legs while they are being positively moved by said wheels.

7. In an apparatus for severing the neck from a poultry carcass for use in conjunction with an overhead conveyor-type dressing line which supports the poultry by their legs from shackles movably carried by said line, the combination comprising a structure having a substantially horizontally disposed upper member, a passageway in said upper member disposed to receive the neck of the carcass when placed in parallel alignment with the overhead conveyor, said passageway being wide enough to permit vertical movement of the neck and of a width to forestall downward vertical passage of the carcass proper, said upper member slanting upwardly in the direction of the movement of the poultry along at least a portion of its length and having a portion of its length at a height so as to permit the resting of the poultry carcass proper upon the upper sides of the passageway, a pair of horizontally disposed rotating wheels spaced beneath the passageway and having spaced indentations around their respective peripheries with said indentations being adapted to receive a portion of the neck of the carcass adjacent said indentations, said wheels being disposed vertically from each other on a common axis with the axis being spaced a distance from the passageway so as to permit with the revolution of the wheels vertical alignment of the indentations with the passageway during a part of the revolution forming substantially closed pockets and permitting the holding of said portion of the neck between said wheels in a relatively fixed erect position while positively moving the neck along at least a portion of the passageway, and a cutting means extending substantially across said passageway and lying in a horizontal plane between said wheels and placed to contact the neck while it is being positively moved by said wheels.

8. In an apparatus designed for severing an extremity from the carcass of a poultry for use in conjunction with an overhead conveyor-type poultry dressing line, the combination comprising a structure, a substantially horizontally disposed upper member to said structure provided with a passageway adapted to receive the extremity of the carcass, a cutting means extending substantially across said passageway, means associated with the passageway for forcing the extremity independent of the overhead conveyor along at least a portion of the passageway into contact with said cutting means, and self-regulating means associated with the passageway and cutting means for vertically adjusting the elevation of the poultry carcass with relation to the cutting means to assure that severance of the extremity will occur at substantially the same relative place of each poultry processed.

9. A device for cutting an extremity from poultry comprising: a pair of wheels provided with spaced recesses around the peripheries thereof, said wheels vertically disposed from each other on a common axis, said recesses of the wheels being in substantially vertical alignment; guide means operatively associated with said wheels for directing the extremity into engagement with said recesses, said guide means cooperating with said recesses to form substantially closed pockets; and cutting means operatively associated with said guide means and extending substantially transversely across said closed pockets.

References Cited in the file of this patent

UNITED STATES PATENTS

| | | |
|---|---|---|
| 1,965,612 | Swanson | July 10, 1934 |
| 2,129,968 | Sargent et al. | Sept. 13, 1938 |
| 2,306,773 | Biffinger | Dec. 29, 1942 |
| 2,632,200 | Fortner et al. | Mar. 24, 1953 |
| 2,638,949 | Blevins et al. | May 19, 1953 |